Jan. 2, 1968  G. R. HUISMAN  3,361,292
STACKING RING FOR MOLDED PLASTIC MILK CRATE
Filed July 8, 1965
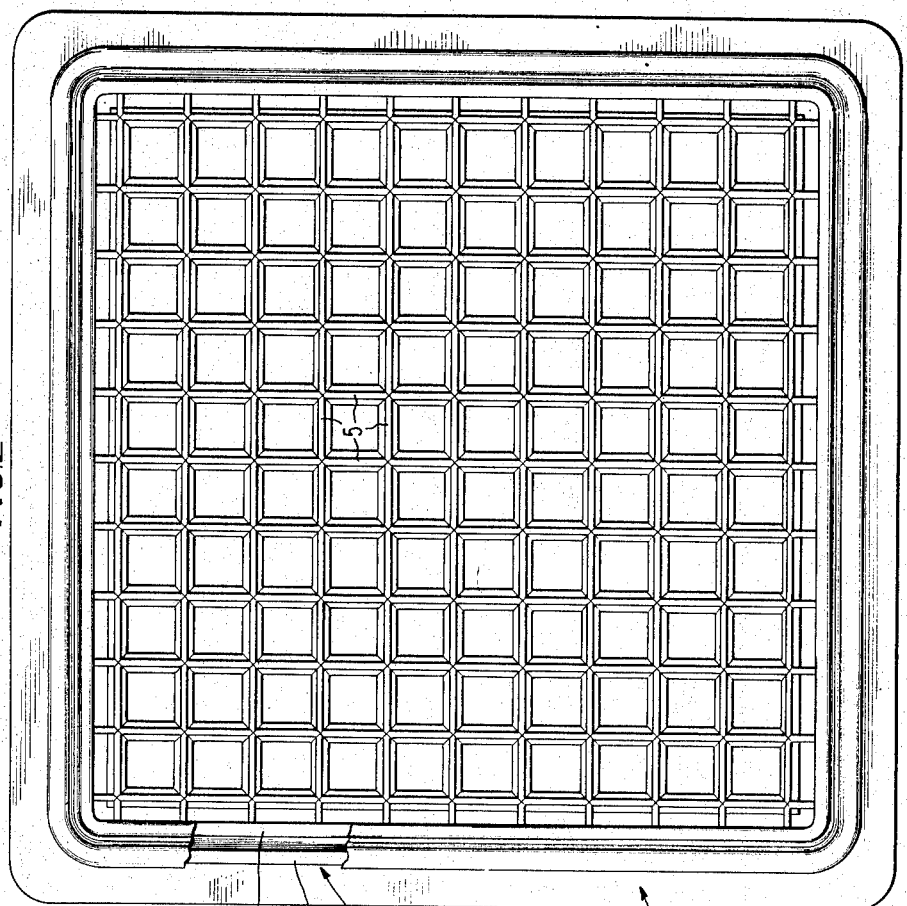
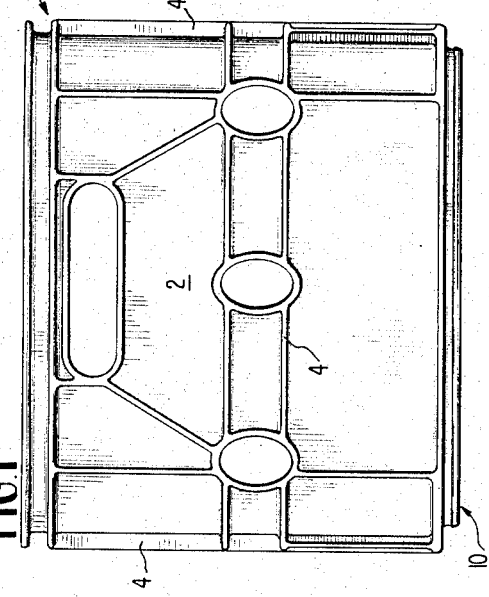
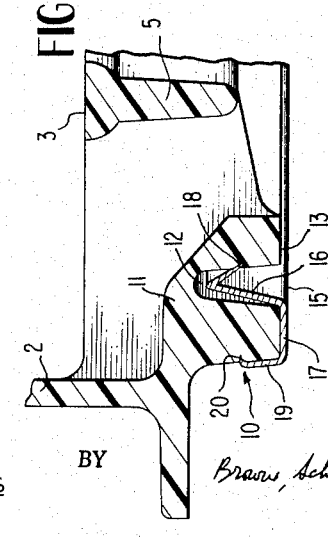
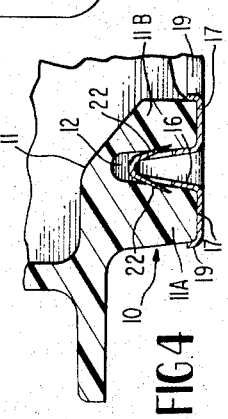
INVENTOR
GEORGE R. HUISMAN
BY Brown, Schuyler & Beveridge
ATTORNEYS

United States Patent Office 3,361,292
Patented Jan. 2, 1968

3,361,292
STACKING RING FOR MOLDED PLASTIC MILK CRATE
George R. Huisman, Inglewood, Calif., assignor to Rehrig Pacific Company, Los Angeles, Calif., a corporation of California
Filed July 8, 1965, Ser. No. 470,490
7 Claims. (Cl. 220—97)

This invention relates to material handling crates, and more particularly to an improved stacking ring for molded plastic material handling crates.

Material handling crates, such as the crates employed for handling a plurality of bottles or cartons of milk, are conventionally constructed with bottom portions designed or shaped to facilitate stacking of the crates. This stacking arrangement may include a ring-like structure carried on the outer surface of the bottom panel in position to project into the open top of a second crate positioned thereunder. Such a stacking ring also serves to reinforce the bottom panel as well as to provide a bearing surface to facilitate sliding the crate over a horizontal surface such as a floor or the bed of a truck, and to protect the bottom panel from wear resulting from such sliding movement.

In crates of this general type which are molded from plastic material such as polyethylene, the formation of a satisfactory stacking ring presents many problems not encountered in the conventional wire frame or wooden crates. For example, conventional fasteners cannot be satisfactorily employed to secure a separately formed ring onto a molded plastic bottom panel, making it necessary to form the stacking ring integrally with the bottom panel. However, since the stacking ring is normally subjected to very high loads during handling, it must necessarily be substantially more massive than is necessary for the remainder of the bottom panel. This great variation in the mass of various segments results in different portions of the integrally formed structure requiring widely differing curing times within the mold. Further, the plastic materials frequently employed to mold the plastic crates are both somewhat resilient and subject to rapid wear by abrasion, this lack of rigidity reducing the effectiveness of the stacking ring as a support for the bottom panel, and the lack of resistance to abrasion materially shortening the effective life of the structure.

It is an object of this invention to provide a molded plastic crate having an improved stacking ring.

Another object of this invention is to provide a molded plastic crate including a stacking ring having improved strength and wear qualities.

In the attainment of the foregoing and other objects, an important feature of the invention resides in a molded plastic material handling crate having a stacking ring integrally molded around the bottom panel of the crate. The stacking ring has an upwardly directed channel formed in its bottom surface dividing the lower portion of the ring into a pair of spaced rails and receiving and supporting a metallic bearing element. The bearing element is fixedly secured within the channel and includes a bearing surface projecting below the bottom surface of the molded plastic portion of the stacking ring.

Other objects and advantages of the invention will become apparent from the following specification, taken with the drawings, in which:

FIG. 1 is a side elevation view of a molded plastic milk crate embodying the present invention;

FIG. 2 is a bottom plan view of the crate shown in FIG. 1;

FIG. 3 is an enlarged fragmentary sectional view taken on line 3—3 of FIG. 1 and showing the stacking ring; and, FIG. 4 is a view similar to FIG. 3 showing an alternate construction of the bearing element of the stacking ring.

Referring now to the drawings in detail, a generally rectangular material handling crate of the type commonly employed by the dairy industry to handle a plurality of bottles or cartons of milk, and which embodies the present invention is illustrated generally by the reference numeral 1. Crate 1 is molded from a suitable plastic material such as polyethylene, and includes integrally molded side walls 2 and bottom panel 3. Side walls 2 are preferably reinforced by a plurality of integrally molded webs or flanges 4, as shown in FIG. 1, to increase their resistance to buckling or deflection, particularly when subjected to external loads such as may result from stacking a plurality of the crates one upon another.

Bottom panel 3 may be of any desired configuration. However, for crates used to handle relatively large or fragile articles such as milk bottles, the bottom is preferably of the open grid construction illustrated in FIG. 2, as this construction provides a strong and relatively rigid support while requiring a minimum of material. As shown in FIG. 3, the grid may be formed from perpendicularly arranged generally T-shaped segments 5. This T-shaped cross-section of the segments 5 provides a smooth surface 6 for supporting articles and at the same time maintains the dimensions of the segments at a minimum so that excessive curing time in the mold is not required.

Stacking ring 10 is molded on the bottom of crate 1 adjacent the outer periphery thereof, and projects downwardly below the bottom of panel 3. Ring 10 comprises a ledge 11 formed from a plastic material and integrally molded with the bottom panel 3. Channel 12 extends upwardly from the bottom surface 13 of ledge 11 to form a pair of spaced, generally parallel rails 11A and 11B, thereby giving ledge 11 a cross sectional shape similar to an inverted U, as most clearly seen in FIGS. 3 and 4. Channel 12 reduces the mass of the ledge and also substantially reduces the thickness of the plastic material in the various segments of the ledge, thereby materially reducing the curing time required for the ledge during the molding operation.

Stacking ring 10 also includes a metallic bearing element 15 fixedly secured to ledge 11 within channel 12. Preferably, insert 15 is formed from an elongated strip of relatively heavy gage sheet material shaped to include a generally V-shaped segment 16 projecting into channel 12, and a second segment 17 having a bearing portion overlying and engaging at least a portion of bottom surface 13 of ledge 11 to provide a wear resistant bearing surface for the stacking ring. In the embodiment illustrated in FIG. 3, the V-shaped segment 16 has a terminal edge 18 engaging and penetrating the surface of channel 12, and bearing segment 17 has a right angled segment 19 terminating in an inwardly turned edge 20 penetrating the outer surface of ledge 11. Terminal edges 18 and 20 cooperate to positively retain the bearing element 15 in firm engagement with ledge 11, so that the ledge and bearing element cooperate to form a strong yet light weight stacking ring having excellent wear resistant qualities.

As an alternate construction, illustrated in FIG. 4, the bearing element 15 may be retained on ledge 11 by a plurality of barbs 22 staked outwardly from the segment 16 positioned within channel 11, with the barbs 22 being formed on both sides of the V-shaped segment to engage and penetrate the channel on both sides thereof. In this embodiment the bearing element 15 is provided with two bearing segments 17 to completely cover the bottom bearing surface 13 of ledge 11. It has been found that the barbs penetrating both sides of the channel 12 are sufficient to retain the bearing element 15 within the channel so that the inwardly turned edge 20 formed on the right angle section 19 is not required. However, it may be desirable to provide the right angled sections 19 to provide smooth rounded corners for the bearing surface to facilitate sliding of the crate across a supporting surface such as a floor.

While I have disclosed a preferred embodiment of my invention I wish it understood that I do not intend to be restricted solely thereto but that I do intend to cover all embodiments thereof which would be apparent to one skilled in the art and which come within the spirit and scope of my invention.

I claim:

1. In a material handling crate having side panels and a molded plastic bottom panel, a stacking ring on said bottom panel comprising, a plastic ledge molded integrally with and projecting downwardly below the bottom surface of said bottom panel to support said crate on a supporting surface with said bottom panel spaced therefrom, said ledge extending in inwardly spaced parallel relation to each side edge of said crate, an upwardly extending channel formed in the bottom surface of said ledge and extending substantially the full length thereof along each said side edge to divide said ledge into a pair of substantially parallel rails along said side edges and integrally joined at their upper edges, and a metallic insert fixedly secured within each said channel, said insert extending substantially the full length of each said channel and forming at least a portion of the bottom bearing surface of said stacking ring.

2. A material handling crate as defined in claim 1 wherein the ledges extending along each side edge are integrally joined at their respective ends to form a closed ring extending downwardly from the bottom surface of said bottom panel.

3. A material handling crate as defined in claim 2 wherein said insert is formed from a section of sheet metal and includes a reversely bent segment having the generally cross-sectional shape of an inverted V disposed within said channel, said V-shaped segment engaging the side walls of said channel to retain said insert against removal.

4. A material handling crate as defined in claim 3 wherein said insert further includes a second segment integrally joined to said V-shaped segment and disposed in overlying relation with a portion of the bottom surface of said ledge when said V-shaped segment is disposed within said channel.

5. A material handling crate as defined in claim 3 wherein at least a portion of one leg of said V-shaped segment penetrates the surface of said ledge within said channel to positively retain said segment against removal from said channel.

6. A material handling crate as defined in claim 4 wherein said second segment includes means penetrating the surface of said ledge to cooperate with said V-shaped segment to retain said insert in position on said ledge.

7. A material handling crate as defined in claim 1 wherein said metallic insert includes barb means penetrating the surface of said ledge within said channel to positively retain said insert against removal.

References Cited

UNITED STATES PATENTS

| | | | |
|---|---|---|---|
| 2,117,489 | 5/1938 | Madsen | 52—716 |
| 2,398,528 | 4/1946 | Hamilton | 312—330 |
| 2,850,204 | 9/1958 | Rehrig | 217—69 |
| 3,200,988 | 8/1965 | De Chelbor | 220—21 |
| 3,245,548 | 4/1966 | Kesilman et al. | 220—21 |

FOREIGN PATENTS

| | | |
|---|---|---|
| 1,294,785 | 4/1962 | France. |
| 973,724 | 10/1964 | Great Britain. |

WILLIAM T. DIXSON, Jr., *Primary Examiner.*

THERON E. CONDON, *Examiner.*